(12) United States Patent
Simionescu

(10) Patent No.: US 10,583,924 B2
(45) Date of Patent: Mar. 10, 2020

(54) VERTICAL TAKEOFF AND LANDING UNMANNED AERIAL VEHICLE (VTOL-UAV)

(71) Applicant: Petru A. Simionescu, Corpus Christi, TX (US)

(72) Inventor: Petru A. Simionescu, Corpus Christi, TX (US)

( * ) Notice: Subject to any disclaimer, the term of this patent is extended or adjusted under 35 U.S.C. 154(b) by 403 days.

(21) Appl. No.: 15/721,945

(22) Filed: Oct. 1, 2017

(65) Prior Publication Data

US 2019/0100308 A1    Apr. 4, 2019

(51) Int. Cl.
*B64C 39/02* (2006.01)

(52) U.S. Cl.
CPC .......... *B64C 39/024* (2013.01); *B64C 39/022* (2013.01); *B64C 2201/027* (2013.01); *B64C 2201/042* (2013.01); *B64C 2201/044* (2013.01); *B64C 2201/108* (2013.01)

(58) Field of Classification Search
CPC ............... B64C 39/024; B64C 39/022; B64C 2201/042; B64C 2201/108; B64C 2201/044; B64C 2201/027; B64C 15/14; B64D 35/04
See application file for complete search history.

(56) References Cited

U.S. PATENT DOCUMENTS

| | | | | | |
|---|---|---|---|---|---|
| 2,690,809 | A | * | 10/1954 | Kerry | B64C 23/005 416/22 |
| 3,002,709 | A | * | 10/1961 | Cochran | B64C 29/0025 244/12.2 |
| 3,915,411 | A | * | 10/1975 | Surbaugh | B64C 29/00 244/12.2 |
| 4,196,877 | A | * | 4/1980 | Mutrux | B64C 39/06 244/12.2 |
| 4,807,830 | A | * | 2/1989 | Horton | B64C 39/001 244/12.2 |
| 5,152,478 | A | * | 10/1992 | Cycon | B64C 27/10 244/12.2 |
| 6,270,038 | B1 | * | 8/2001 | Cycon | B64C 27/20 244/12.2 |
| 7,988,087 | B1 | * | 8/2011 | Tonks | B64C 15/12 239/265.11 |
| 10,071,800 | B2 | * | 9/2018 | Boros | B64C 27/08 |
| 10,486,810 | B2 | * | 11/2019 | Lan | B64C 15/02 |
| 2018/0208304 | A1 | * | 7/2018 | Vedamanikam | B64C 39/024 |

* cited by examiner

*Primary Examiner* — Valentina Xavier

(57) ABSTRACT

A vertical takeoff and landing unmanned aerial vehicle (VTOL-UAV) is provided consisting of one central motor which drives one ducted fan and one or more rotors. These rotors can be coaxial with the fan, or can be located off-center being driven via a transmission. For flight control purposes, all or a portion of the air circulated by the ducted fan and/or by the central rotor is diverted through a plurality of side ducts towards the periphery of the vehicle and then downwards, each of these side duct being fitted at their peripheral ends with air-flow vectorization means. These air-flow vectorization means can be in the form of parallel vanes, and/or in the form of thrust-control buckets, which are turnable around axes perpendicular to the flow of air, and are actuated by servomotors via cables or linkages.

12 Claims, 6 Drawing Sheets

VERTICAL TAKEOFF AND LANDING UNMANNED AERIAL VEHICLE (VTOL-UAV)

BACKGROUND—PRIOR ART

The following is a tabulation of some prior art that presently appears relevant

| U.S. Pat. No. | Kind Code | Issue Date | Patentee |
| --- | --- | --- | --- |
| DE202013001622 | U1 | 2013 Apr. 8 | N/A |
| 1,749,471 | A | 1930 Mar. 4 | De Bothezat |
| 2,571,566 | A | 1951 Oct. 16 | Green |
| 2,695,674 | A | 1954 Nov. 30 | Kaman and Stevens |
| 3,038,683 | A | 1962 Jun. 12 | Brian |
| 3,053,480 | A | 1962 Sep. 11 | Vanderlip |
| 3,139,244 | A | 1964 Jun. 30 | Bright |
| 3,388,878 | A | 1964 Jun. 30 | Opfer et al. |
| 3,433,244 | A | 1969 Mar. 18 | Dyson et al. |
| 4,125,232 | A | 1978 Nov. 14 | Maclean and Spector |
| 4,196,877 | A | Apr. 8, 1980 | Mutrux |
| 4,222,234 | A | 1980 Sep. 16 | Adamson |
| 4,469,294 | A | 1984 Sep. 4 | Clifton |
| 4,660,767 | A | 1987 Apr. 28 | Scrace |
| 4,789,115 | A | 1988 Dec. 6 | Koutsoupidis |
| 4,795,111 | A | 1989 Jan. 3 | Moller |
| 4,948,068 | A | 1990 Aug. 15 | VanHorn |
| 5,141,176 | A | 1992 Aug. 25 | Kress and Gebhard |
| 5,240,205 | A | 1993 Aug. 31 | Allongue |
| 6,450,445 | B1 | 2002 Sep. 17 | Moller |
| 7,032,861 | B2 | 2006 Apr. 25 | Sanders Jr. et al. |
| 7,383,907 | B2 | 2008 Jun. 10 | Talanov and Pribylsky |
| 7,510,142 | B2 | 2009 Mar. 31 | Johnson |
| 7,658,346 | B2 | 2010 Feb. 9 | Goossen |
| 7,806,362 | B2 | 2010 Oct. 5 | Yoeli |
| 7,857,254 | B1 | 2010 Dec. 28 | Parks |
| 7,874,513 | B1 | 2011 Jan. 25 | Smith |
| 7,959,104 | B2 | Jun. 14, 2011 | Kuntz |
| 8,128,019 | B2 | 2012 Mar. 6 | Annati and O'Brien |
| 8,579,228 | B2 | 2013 Nov. 12 | Monleau and Vilbois |
| 8,596,570 | B1 | 2013 Dec. 3 | Carambat |
| 8,727,271 | B2 | 2014 May 20 | Salyer |

NONPATENT LITERATURE DOCUMENTS

R. Capata, L. Marino, and E. Sciubba, "A hybrid propulsion system for a high-endurance UAV: configuration selection, aerodynamic study, and gas turbine bench tests", Journal of Unmanned Vehicle Systems, 2014, 2(1), p. 16-35, https://doi.org/10.1139/juvs-2013-0005

BACKGROUND OF THE INVENTION

The present invention relates to an aerial vehicle, particularly to a vertical takeoff and landing (VTOL) unmanned aerial vehicle (UAV).

Several designs of VTOL aerial vehicles are known, which either employ (i) one main vertical rotor together with anti-torque means, (ii) two coaxial counter-rotating rotors, (iii) two in-parallel counter-rotating rotors, or (iv) multiple in-parallel rotors. Similar designs are also found in VTOL-UAVs together with other configurations allowed by the reduced scale and the use of battery powered electric motors.

To extend their endurance, internal combustion engines (ICE), either of the gas turbine or reciprocating type, have been introduced in the design of VTOL-UAVs. Hybrid ICE-electric propulsion systems have been also proposed, as well as electric VTOL-UAVs powered from the ground via tethering cables.

The above described VTOL-UAVs suffer however from being complicated in design, or from being inherently unstable, consequence of the center of pressure being located below the center of gravity of the vehicle.

ADVANTAGES

An objective of this invention is to provide an improved VTOL-UAV which is simple in design, and additionally has a low center of gravity for added stability.

These objectives are achieved in accordance with the present invention by the provision of a VTOL-UAV which consists of one central motor (e.g. either an internal combustion engine, a battery powered electric motor, or an electric motor powered from the ground via a tethering cable) which directly drives one ducted fan placed in the center, and one or more rotors. Said rotors can be mounted in series with the ducted fan, or can be mounted off-center and have their axes two by two opposing. These off-center rotors are driven by the central motor via belt transmissions or via horizontal shafts and bevel-gear pairs. For flight control purposes, all or a portion of the air circulated by the ducted fan and/or by the central rotor is diverted through a plurality of side ducts towards the periphery of the vehicle and then downward, each said side duct being fitted at its outer end with air-flow vectorization means. These air-flow vectorization means can be in the form of parallel vanes and/or in the form of thrust-control buckets, which are turnable around axes perpendicular to the flow of air, and are actuated by servomotors, either directly or via cables or linkages.

BRIEF DESCRIPTION OF THE DRAWINGS

The present invention, together with objects and advantages thereof may be best understood by reference to the following description together with the accompanying drawings. Note the use in these drawings of solid-tailed arrows to indicate directions of rotation, and empty arrows to indicate flows of air. It should be understood that not all alternatives and options are illustrated with drawings and, therefore, the invention is not limited in scope to the content of these drawings.

DESCRIPTION OF THE PREFERRED EMBODIMENTS

Figure 1:
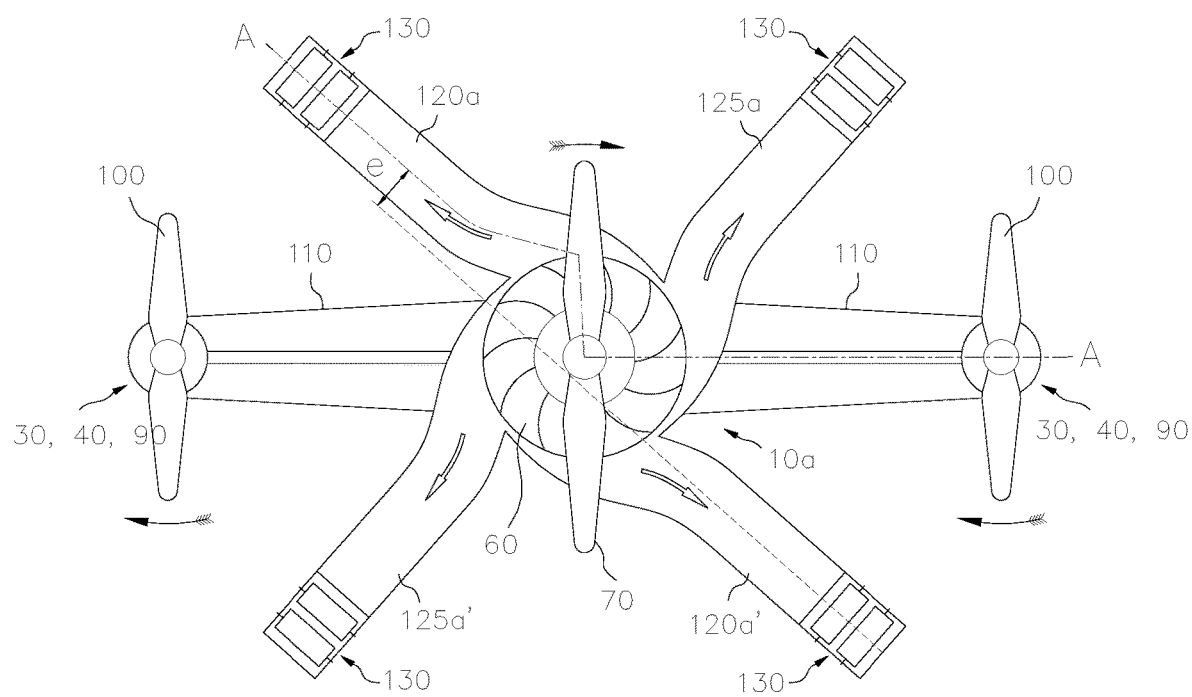
FIGS. 1 and 2 are top view and cut side-view along line A-A of one embodiment of a VTOL-UAV according to the present invention, where one central motor, in particular a battery-powered electric motor, drives one ducted centrifugal fan, one central rotor coaxial with the ducted fan, and two off-center rotors, all rotating in the same direction. The said VTOL-UAV is further equipped with four side ducts which are fed air by the ducted fan. In their vertical-median plane these side ducts are oriented upwards, then horizontally and then downwards. In a top view, said side ducts appear slightly spiraled, then straight, forming an equally spaced polar array centered on the axis of the ducted-fan. For the purpose of air-flow vectorization, the said side ducts are fitted at their peripheral ends with turnable vanes actuated by servomotors.
Figure 2:
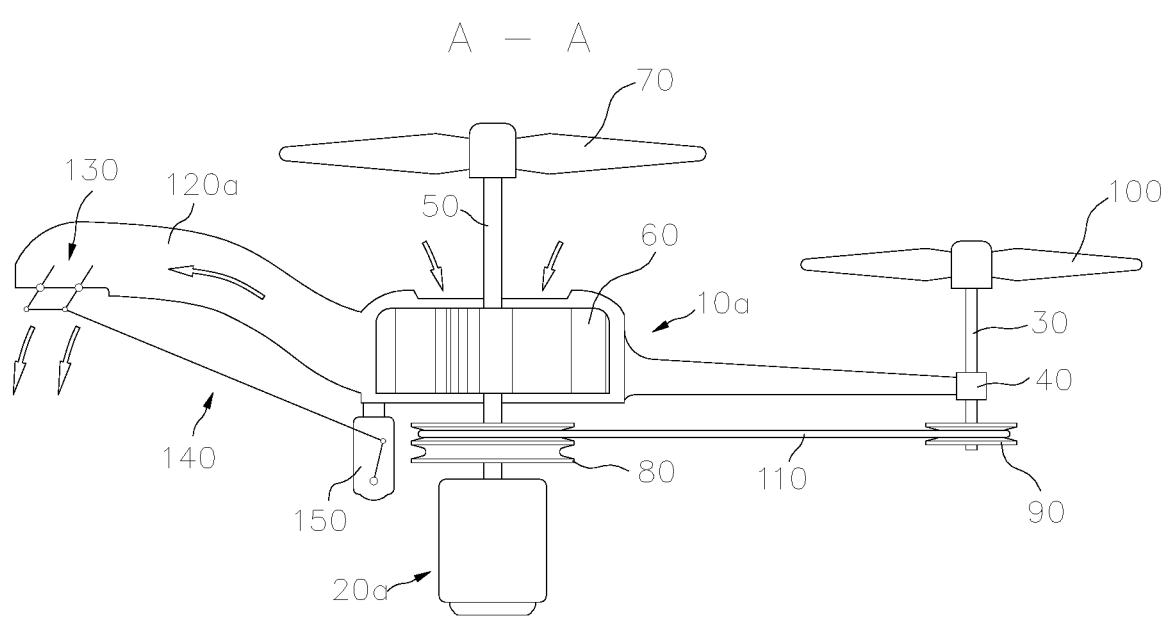

FIGS. 1 and 2 show a VTOL-UAV according to the present invention consisting of a main body 10a which supports a central motor 20a, and two off-center vertical shafts 30. Central motor 20a is battery-powered electric, and delivers its power through a main shaft 50 on which there are mounted a centrifugal fan 60, a rotor 70 and a double sheave 80. Shafts 30 are supported relative to main body 10a by bearings 40, and have attached to their lower end one sheave 90, and to their upper end one off-center rotor 100. Shafts 30 together with their off-center rotors 100 rotate in the same direction, being driven by the main shaft 50 via belts 110. Main body 10a is shaped around centrifugal fan 60 such that it facilitates a forced flow of air through side ducts 120a, 120a' 125a and 125a' which are dispose as an equally spaced polar array centered on the central-motor axis 50. In top view said side ducts appear slightly spiraled, then straight, the centroidal axes of the straight portions being off-centered by a distance e, while in their vertical-median plane they are oriented upwards, then horizontally, then are curved downwards. At their peripheral ends, side ducts 120a, 120a' 125a and 125a' are fitted with a plurality of parallel vanes 130, turnable about axes perpendicular to the flow of air. The angle of parallel vanes 130 can be modified using linkages 140 and servo actuators 150, for the purpose of air-flow vectorization and altitude, attitude and anti-torque control of said VTOL-UAV.

Figure 3:
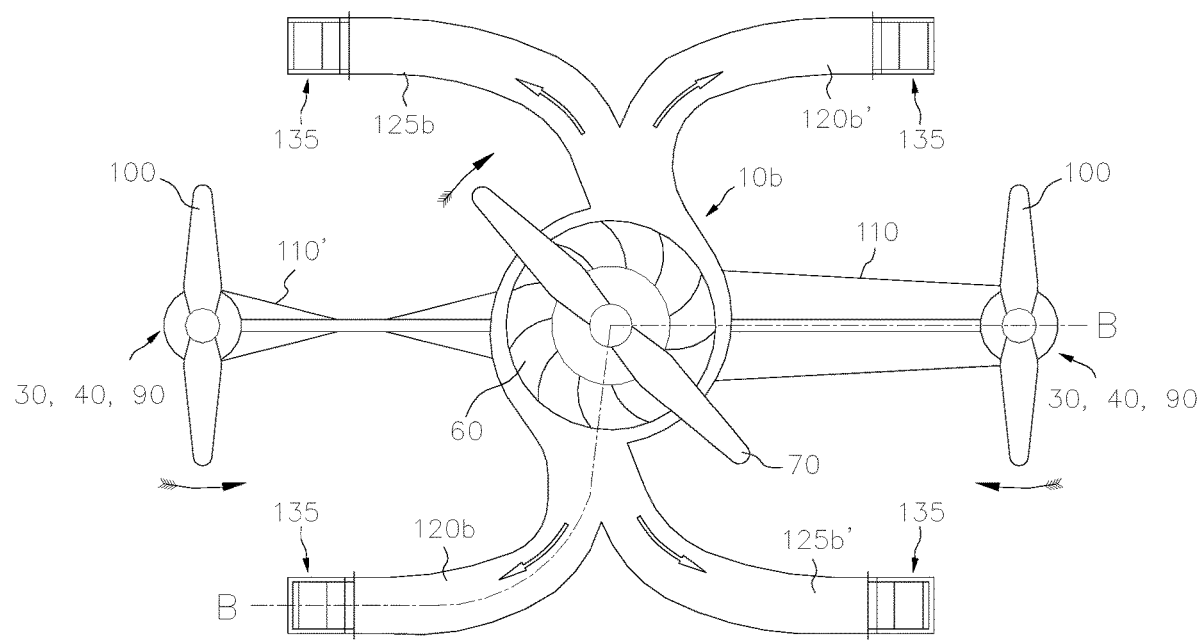
FIGS. 3 and 4 are top view and cut side-view along line B-B of another embodiment of a VTOL-UAV according to the present invention, where one central motor, in particular an internal-combustion engine (ICE), drives one ducted centrifugal fan, one central rotor coaxial with the fan, and two off-center rotors, where said off-center rotors rotate in opposite directions. The VTOL-UAV according to the present invention is further equipped with four side ducts which in top view appear spiraled, two of them clockwise and the other two counterclockwise, and also appear to end inline and opposing each other. In their vertical-median plane each said side ducts are oriented upwards, then horizontally and then downwards. For the purpose of air-flow vectorization, the said side ducts are fitted at their peripheral ends with turnable thrust-control buckets actuated by servomotors.
Figure 4:
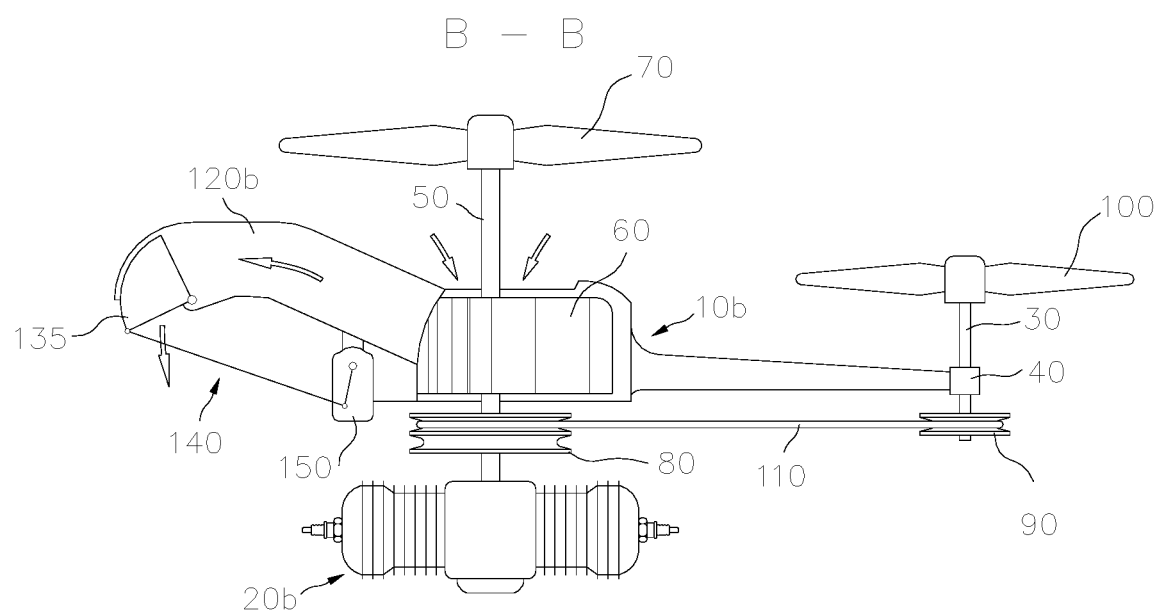

FIGS. 3 and 4 show another embodiment of the VTOL-UAV according to the present invention, equipped with a central motor 20b of the ICE type, and where one off-center rotor 100 is driven via a cross-belt 90' and rotates opposite to than main shaft 50. Main body 10b is shaped around centrifugal fan 60 such that it facilitates a forced flow of air to the inside of side ducts 120b, 120b', 125b and 125b'. In top view side ducts 120b, 120b' are spiraled clockwise, while side ducts 125b and 125b' are spiraled counterclockwise. In top view the outer sections of side ducts 120b, 120b', 125b and 125b' appear straight and two-by-two inline and away from each other. In their vertical-median plane said side ducts are oriented upwards, then horizontally and then are curved downwards. At their peripheral end side ducts 120b, 120b', 125b and 125b' are fitted with turnable thrust-control buckets 135, the angle of which can be modified using linkages 140 and servo actuators 150, for the purpose of air-flow vectorization and altitude, attitude and anti-torque control of said VTOL-UAV.

Figure 5:
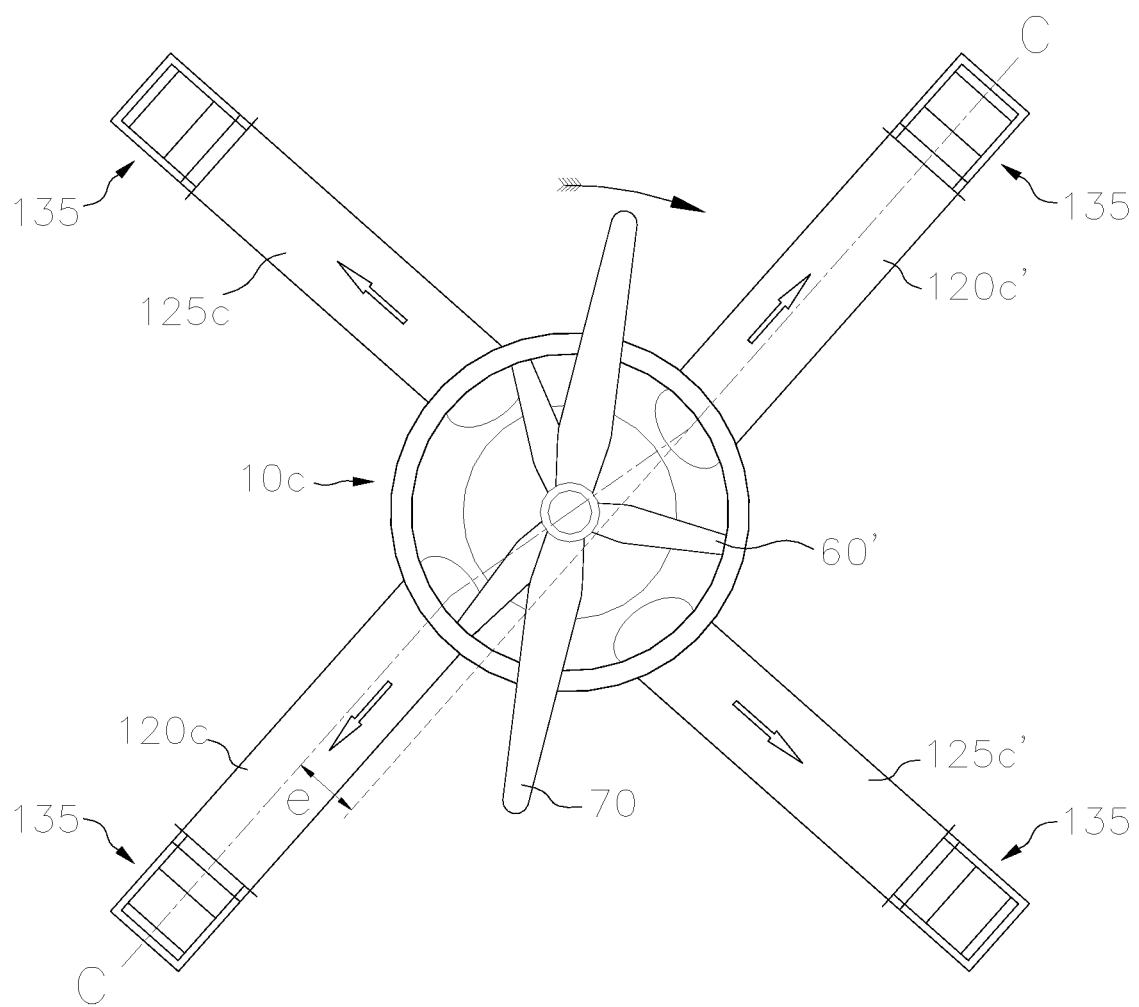
FIGS. 5 and 6 are top view and cut side-view along line C-C of yet another embodiment of a VTOL-UAV according to the present invention, where one central motor, in particular an electric motor powered from the ground via a tethering cable, drives one central rotor and one ducted axial fan. The VTOL-UAV is further equipped with four side ducts which are fed part of the air moved by the ducted fan, the other part being forced downwards along and around the central motor to provide lift. In a top view, said side ducts appear straight and two-by-two parallel, forming an equally spaced polar array centered on the axis of the ducted-fan. In their vertical-median plane said side ducts are oriented upwards, then horizontally and then are curved downwards. For the purpose of air-flow vectorization, the said side ducts are fitted at their peripheral ends with turnable thrust-control buckets actuated by servomotors.
Figure 6:
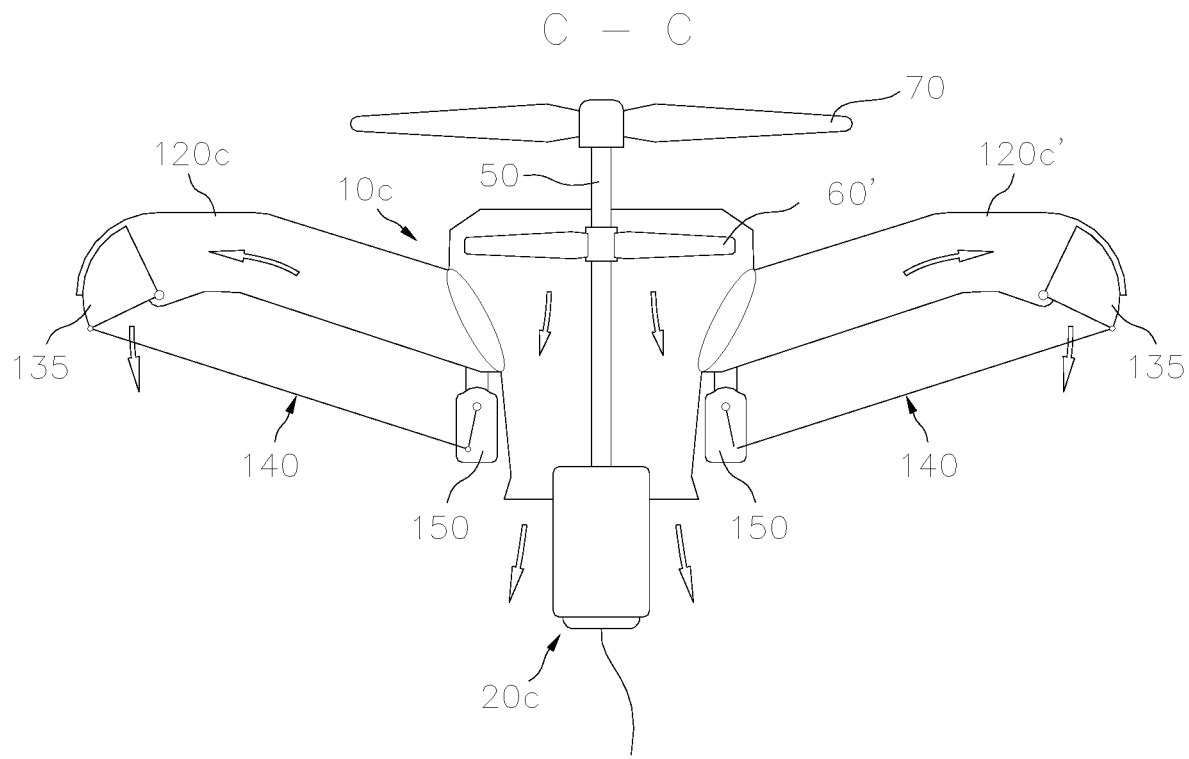

FIGS. 5 and 6 show another embodiment of the VTOL-UAV according to the present invention, which is equipped with an electric central motor 20c powered from the ground via a tethering cable. Main body 10c is shaped such that part of the air moved by axial fan 60' is forced through side ducts 120c, 120c', 125c and 125c', the rest of the air being forced down and around main motor 10c, to provide lift supplemental to the one generated by central rotor 70. In a top view side ducts 120c, 120c', 125c and 125c' appear straight and two-by-two parallel and off-center by a distance e. In their vertical-median plane said side ducts are oriented upwards, then horizontally and then are curved downwards. The said side ducts are fitted at their peripheral ends with turnable thrust-control buckets 135, the angle of which can be modified using linkages 140 and servo actuators 150, for the purpose of air-flow vectorization and altitude, attitude and anti-torque control.

The VTOL-UAV examples presented herein are illustrative rather than limitative, and a person having ordinary skill in the art may modify, adapt and alter them within the scope and equivalence of the following claims.

What is claimed is:

1. Vertical takeoff and landing unmanned aerial vehicle (VTOL-UAV) comprising a central motor which drives one ducted fan, one rotor coaxial with the fan, and a plurality of rotors that are off-centered, said VTOL-UAV being further equipped with a plurality of side ducts which direct all or part of the air moved by the ducted fan outwards, at first up, then horizontally, then downwards, said side ducts being fitted at their peripheral end with air flow vectorization means for the purpose of altitude, attitude and anti-torque control of the VTOL-UAV.

2. VTOL-UAV according to claim 1 where, in a top view, said side ducts are slightly spiraled in the same direction, then straight, and have an overall appearance of a polar array centered at the axis of the ducted fan, while in their median-vertical planes said side ducts are two-by-two parallel and off-centered by a certain amount.

3. VTOL-UAV according to claim 1 where the side ducts are four in number, and, when viewed from above, two side ducts appear spiraled clockwise, the other two appear spiraled counterclockwise, and all four side ducts appear to end straight and two-by-two inline and pointing away from each other.

4. VTOL-UAV according to claim 1 where the air flow vectorization means are in the form of one or more parallel vanes turnable around axes perpendicular to the flow of air through the said side ducts, and are actuated by servomotors, either directly or via cables or linkages.

5. VTOL-UAV according to claim 1 where the air flow vectorization means are in the form of thrust control buckets turnable around axes perpendicular to the flow of air through the said side ducts, and are actuated by servomotors, either directly or via cables or linkages.

6. VTOL-UAV according to claim 1 where, the ducted fan is of the centrifugal type.

7. VTOL-UAV according to claim 1 where, the ducted fan is of the axial type.

8. VTOL-UAV according to claim 1 where at least one rotor is coaxial with the ducted fan.

9. VTOL-UAV according to claim 1 where at least two rotors are positioned off-center and directly opposing, and are driven each by the central motor via a transmission.

10. Vertical takeoff and landing unmanned aerial according to claim 1 where the central motor is an electric motor powered by an onboard battery.

11. Vertical takeoff and landing unmanned aerial according to claim 1 where the central motor is an internal combustion engine.

12. Vertical takeoff and landing unmanned aerial according to claim 1 where the central motor is an electric motor powered from the ground via a tethering cable.

* * * * *